US006487595B1

(12) United States Patent
Turunen et al.

(10) Patent No.: US 6,487,595 B1
(45) Date of Patent: Nov. 26, 2002

(54) RESOURCE RESERVATION IN MOBILE INTERNET PROTOCOL

(75) Inventors: Matti Turunen, Tampere (FI); Jouni Mikkonen, Tampere (FI)

(73) Assignee: Nokia Mobile Phones Limited, Espoo (FI)

(*) Notice: Subject to any disclaimer, the term of this patent is extended or adjusted under 35 U.S.C. 154(b) by 0 days.

(21) Appl. No.: 09/208,685

(22) Filed: Dec. 10, 1998

(30) Foreign Application Priority Data

Dec. 18, 1997 (FI) .................................................. 974558

(51) Int. Cl.⁷ ........................ G06F 15/173; G06F 15/16
(52) U.S. Cl. ........................ 709/226; 709/233; 709/249
(58) Field of Search ...................... 710/29, 65; 455/466; 370/235–236; 379/900; 709/225–226, 228, 240, 232–233, 249, 328

(56) References Cited

U.S. PATENT DOCUMENTS

| 5,257,257 | A |   | 10/1993 | Chen et al. .................... 370/18 |
| 5,640,395 | A |   | 6/1997  | Hamalainen et al. ........ 370/322 |
| 5,729,534 | A |   | 3/1998  | Jokinen et al. .............. 370/280 |
| 5,729,541 | A |   | 3/1998  | Hamalainen et al. ........ 370/337 |
| 5,787,080 | A | * | 7/1998  | Hulyalkar et al. ........... 370/348 |
| 5,790,534 | A |   | 8/1998  | Kokko et al. ................ 370/335 |
| 5,802,465 | A |   | 9/1998  | Hamalainen et al. ........ 455/403 |
| 5,859,843 | A | * | 1/1999  | Honkasalo et al. .......... 370/342 |
| 5,898,925 | A | * | 4/1999  | Honkasalo et al. .......... 455/437 |
| 5,903,559 | A | * | 5/1999  | Acharaya et al. ............ 370/335 |
| 5,946,320 | A | * | 8/1999  | Decker ........................ 370/428 |
| 5,956,331 | A | * | 9/1999  | Rautiola et al. ............. 370/338 |

(List continued on next page.)

FOREIGN PATENT DOCUMENTS

| WO | WO 95/25407 | 9/1995  |
| WO | WO 95/31060 | 11/1995 |
| WO | WO 98/48593 | 10/1998 |
| WO | WO 98/57482 | 12/1998 |
| WO | WO 99/16266 | 4/1999  |

OTHER PUBLICATIONS

Andreoli, G., et al., Mobility Management in IP Networks Providing Real–Time Services, Universal Personal Communications, 1996, IEEE, pp. 774–777 Oct. 1996.*

Awduche, D., et al., Mobile Extensions to RSVP, Proc. of the 6th Int'l. Conf. on Computer Communications and Networks, IEEE, pp. 132–136 Sep. 1997.*

Newton, H., Newton's Telecomm Dictionary, 14th ed., Telecom Books, pp. 66–68, 1998.*

*Primary Examiner*—Andrew Caldwell
(74) *Attorney, Agent, or Firm*—Perman & Green, LLP

(57) ABSTRACT

A method of transmitting Internet data between a mobile host and a remote host coupled via the Internet and a GSM/GPRS cellular telephone network. A plurality of Internet Quality of Service (QoS) levels are defined, in terms of the guaranteed transmission delay over the Internet, using RSVP. A guaranteed QoS is mapped to a circuit switched transmission mode (HSCSD) of the telephone network while a Controlled Load and a Best Effort QoS are mapped respectively to two different service levels of a packet switched transmission mode (GPRS) of the radio telephone network. Prior to transmitting Internet data, transmission capacity in the Internet is reserved, if necessary, to ensure the allocated QoS level is met. The transmission is then made over the Internet and the telephone network, using the transmission mode in the telephone network which is mapped to the allocated QoS.

13 Claims, 3 Drawing Sheets

U.S. PATENT DOCUMENTS

| | | | | |
|---|---|---|---|---|
| 5,966,378 | A | * 10/1999 | Hamalainen | 370/348 |
| 5,987,137 | A | * 11/1999 | Karppanen et al. | 380/28 |
| 5,995,496 | A | * 11/1999 | Honkasalo et al. | 370/18 |
| 6,021,263 | A | * 2/2000 | Kujoory et al. | 709/232 |
| 6,031,827 | A | * 2/2000 | Rikkinen et al. | 370/330 |
| 6,031,832 | A | * 2/2000 | Turina | 370/348 |
| 6,081,534 | A | * 6/2000 | Sipila | 370/466 |
| 6,085,250 | A | * 7/2000 | Perry | 709/230 |
| 6,088,342 | A | * 7/2000 | Cheng et al. | 370/320 |
| 6,091,717 | A | * 7/2000 | Honkasalo et al. | 370/329 |
| 6,122,263 | A | * 9/2000 | Dahlin et al. | 370/329 |
| 6,122,498 | A | * 9/2000 | Sipila et al. | 455/403 |
| 6,144,676 | A | * 11/2000 | Hamalainen et al. | 370/528 |
| 6,167,248 | A | * 11/2000 | Hamalainen et al. | 455/403 |
| 6,181,686 | B1 | * 12/2000 | Hamalainen et al. | 370/347 |
| 6,195,338 | B1 | * 2/2001 | Decker | 370/252 |
| 6,216,006 | B1 | * 4/2001 | Scholefield et al. | 455/450 |
| 6,233,608 | B1 | * 5/2001 | Laursen et al. | 709/217 |
| 6,236,656 | B1 | * 5/2001 | Westerberg et al. | 370/395 |
| 6,289,016 | B1 | * 9/2001 | Subbiah et al. | 370/395 |
| 6,385,451 | B1 | * 5/2002 | Kalliokulju et al. | 370/331 |
| 2001/0015968 | A1 | * 8/2001 | Sicher et al. | 370/352 |
| 2001/0027490 | A1 | * 10/2001 | Fodor et al. | 709/238 |

* cited by examiner

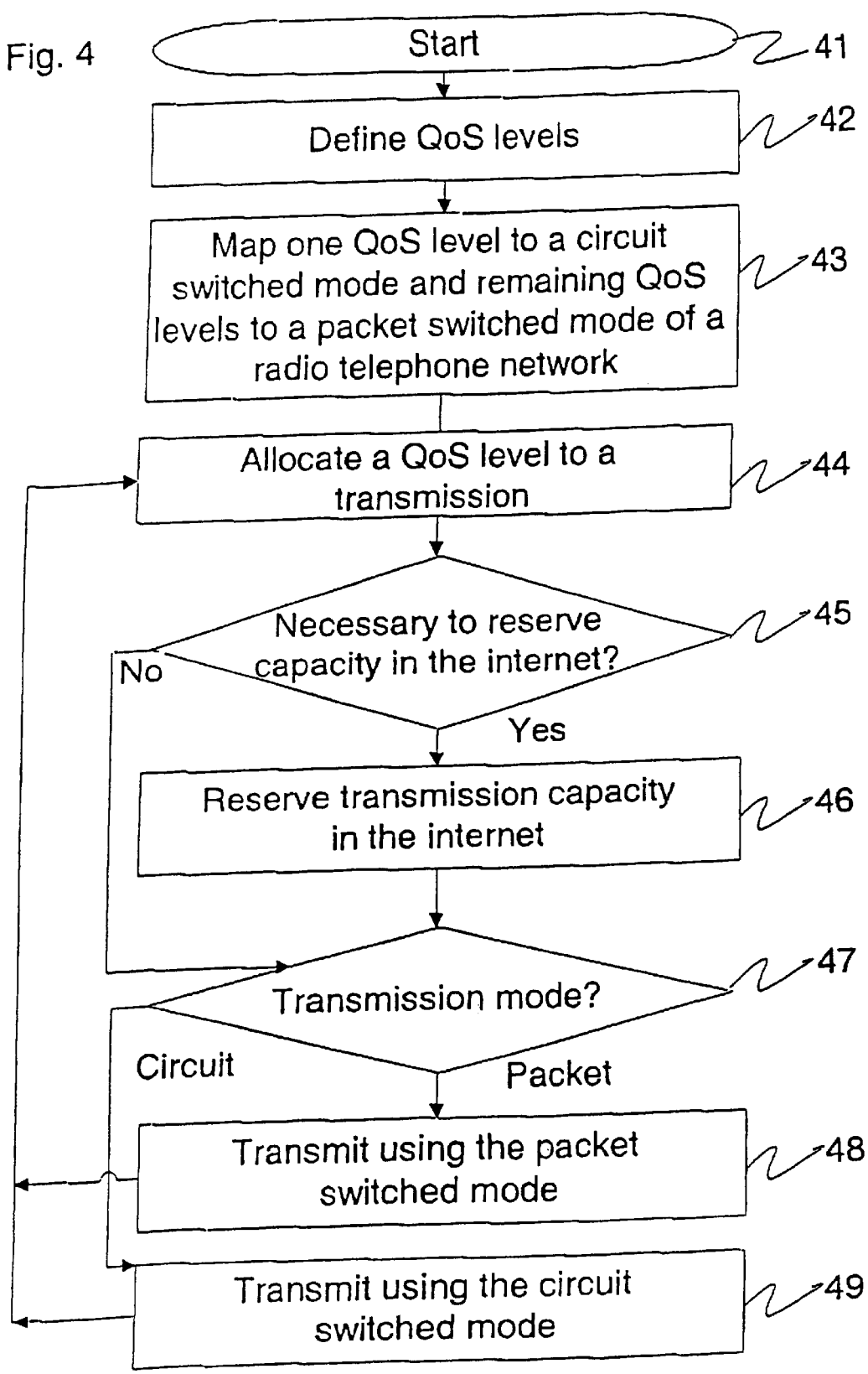

RESOURCE RESERVATION IN MOBILE INTERNET PROTOCOL

FIELD OF THE INVENTION

The present invention relates to a mobile Internet protocol for enabling a mobile terminal to access the Internet.

BACKGROUND OF THE INVENTION

The term "Internet" is commonly used to describe an information resource which can be accessed using a host, typically a PC, connected via a modem to a telecommunications network. This resource is stored at many different sites remote from the accessing computer, although each of the remote sites is also linked to the telecommunications network. The Internet is made workable by the specification of a standard communications system which makes use of a number of protocols, Transfer Control Protocol (TCP), User Datagram Protocol (UDP), and Internet Protocol (IP), to control the flow of data around the numerous different components of the Internet. Whilst TCP and UDP are concerned with the prevention and correction of errors in transmitted Internet data, IP is concerned with the structuring and routing of data. Current versions of IP are IPv4 and IPv6.

The Internet is physically constructed from a hierarchy of telecommunication networks, for example local area networks (LANs), regional telephone networks, and international telephone networks. These networks are connected internally and externally by so-called "routers" which receive data from a source host, or a previous router in the transmission chain, and route it to the destination host or the next router in the transmission chain. FIG. 1 illustrates the case of a source host (SH) and a destination host (DH) coupled to the Internet via respective local area networks (LN) and routers (R).

A host connected to the Internet via a LAN either has an Internet address permanently allocated to it or has an address dynamically allocated by a network server (e.g. using Dynamic Host Configuration Protocol (DHCP)). In the case of a host connected to a telephone network via a modem, the host must request an Internet address from an Internet service provider to which the host subscribes. This is done according to a Point to Point Protocol (PPP) which runs over the IP. In either case, Internet data is routed to the host (possibly via several networks and routers) from some remote source, using the allocated Internet address.

IP defines the transmission of Internet data by way of data packets ("datagrams"). This packet data transfer is one of the main reasons for the success of the Internet as it results in "bursty" transmission which does not require the continuous reservation of a telephone connection and allows many hosts to share the same telephone connections. When a router receives a datagram including a destination address, the router will route the datagram if capacity is available, both in the buffer memory of the router and on the telephone lines. If the router cannot obtain capacity for the datagram then the datagram is rejected and the sending host, or preceding router, must try again at a later time. In general, Internet access is not time critical and the "Best Effort" provided by IP is satisfactory.

Packet data transfer provides efficiencies in data transmission in general, and not only in the retrieval of information from the Internet. For example, packet data transfer may be applied to applications such as voice telephony, video conferencing, and standard data transfer. However, certain of these applications are time critical. Considering real time voice telephony, the Best Effort service provided by IP may result in considerable delays in the transmission of voice data making a received voice signal difficult or impossible to understand. The same applies for the transmission of real time video data. There may also be occasions on which Internet users do not wish to suffer the delays often experienced with conventional Internet data retrieval.

The Internet Engineering Task Force (IETF) is a body which is concerned with the evolution of Internet architecture and the smooth operation of the Internet. The IETF is currently developing a new protocol which will allow a host to request one of a number of reception quality levels (Quality of Service QoS). This protocol is known as Resource ReSerVation Protocol (RSVP. A host uses RSVP to request a specific Quality of Service (QoS) from the network, on behalf of an application data stream which it wishes to receive from some remote host. RSVP carries the request through the network, visiting each router that the network uses to carry the stream. At each router, RSVP attempts to make a resource reservation for the stream. RSVP also attempts to make a resource reservation for the stream at the receiving host and at the sending host.

To make a resource reservation at a node (either a router or a host), the RSVP communicates with two local decision modules, admission control and policy control. Admission control determines whether the node has sufficient available resources to supply the requested QoS. Policy control determines whether the user has administrative permission to make the reservation. If either check fails, the RSVP returns an error notification to the application process that originated the request. If both checks succeed, the RSVP sets parameters in a packet classifier and packet scheduler, at the sending host, to obtain the desired QoS. The packet classifier determines the QoS class for each packet and the scheduler orders packet transmission to achieve the promised QoS for each stream.

RSVP runs over IP, both IPv4 and IPv6. In particular, RSVP is designed to utilise the robustness of current Internet routing algorithms. RSVP does not perform its own routing but instead uses underlying routing protocols to determine where it should carry reservation requests. As routing changes paths to adapt to topology changes, RSVP adapts its reservation to the new paths wherever reservations are in place.

In the current proposed version of RSVP, two QoS levels can be negotiated; Guaranteed Service and Controlled Load Service (in addition to the basic Best Effort service). Guaranteed Service provides both a fixed transmission delay and a fixed bandwidth and is suited to Internet transmissions such as real time voice telephony. Controlled Load Service provides a service level to a data stream which closely approximating the service level that that same data stream would receive from an unloaded network, even when the network is overloaded.

Controlled Load Service is suited to applications where some transmission delay can be tolerated but where it is desired to minimise this delay. In the event that one of these superior QoS levels is not negotiated by RSVP, then Internet data will be received using the conventional Best Effort service. It is possible that in the future RSVP will be extended to provide for the reservation of more than two different additional QoS levels.

With the increased use of mobile cellular telephones, there is a growing demand for so-called mobile Internet access, where access is made from a portable computer connected to a cellular telephone or from an integrated computer/cellular phone device. Currently, subscribers of certain digital cellular telephone networks are able to obtain mobile Internet access by opening a "voice channel" to the cellular network. This channel is reserved for the duration of the Internet "call" and is referred to as a Circuit Switched Data (CSD) channel. A CSD channel is always fully "owned" by a user and thus cannot be violated by other users It will be appreciated that a CSD channel is not efficient for the bursty transmission of Internet data.

Under current proposals, it seems likely that future digital cellular telephone systems will include provision for packet switched transmission channels as well as for circuit switched channels. The general view is that the former will be used for data transmissions, e.g. fax, e-mail, Internet access, whilst the latter will be used for voice calls and possibly combined video/voice calls. In Europe, the current digital cellular telephone standard is known as GSM (Global System for Mobile communications). In the proposed GSM phase 2 system, the packet switched transmission service is known as the General Packet Radio Service (GPRS) whilst the enhanced CSD service is known as High Speed Circuit Switched Data (HSCSD). GPRS and HSCSD are currently the subject of GSM recommendations of the European Telecommunications Standards Institute (ETSI).

It is likely that GPRS will define a number of Quality of Service (QoS) levels in terms of transmission delay, bandwidth, and retransmission (in case of error). Under an existing proposal, four QoS levels are defined (classes 1 to 4). In another possible implementation of GPRS, two main classes may be defined, "delay class" and "service precedents priority", each class having one or more sub-classes.

In order to facilitate the integration of mobile cellular telephony and Internet access, which, as will be apparent from the above discussion, both use different transmission protocols, a protocol known as Mobile IP is under development by the Internet Engineering Task Force (IETF). This protocol is known as RFC2002 and will control the routing of data between a mobile host and the Internet and enable the "roaming" of a mobile host between different networks. Mobile IP also controls the routing of data within the packet switched and circuit switched "domains" which both form separate data transmission routes within a cellular telephone network.

It is an object of the present invention to enable RSVP to reserve digital cellular telephone services for the transfer of Internet data, and thus to facilitate the substantially seamless flow of Internet data across the Internet and digital cellular telephone networks.

SUMMARY OF THE INVENTION

This and other objects are achieved by mapping RSVP QoS levels to service levels provided by cellular telephone networks.

According to a first aspect of the present invention there is provided a method of transmitting data between first and second Internet hosts coupled via the Internet and a digital radio telephone network, the method comprising:

defining a plurality of Internet Quality of Service (QoS) levels in terms of the transmission delay over the Internet;

mapping at least one of the defined Internet QoS levels to a circuit switched transmission mode of the radio telephone network and mapping the remaining QoS level(s) to a packet switched transmission mode of the radio telephone network;

prior to transmitting said data, allocating one of said QoS levels to the transmission and, if necessary, reserving transmission capacity in the Internet to ensure the allocated QoS level is met; and transmitting said data over the Internet and said radio telephone network, wherein the transmission over the radio telephone network uses the transmission mode mapped to the allocated QoS level.

Preferably, said Internet QoS levels include: a guaranteed service level which guarantees both delay and bandwidth; a controlled load service level which provides a service level closely approximating the service level that would be provided by an unloaded network, even when the network is overloaded; and a best effort service which guarantees neither delay nor bandwidth. More preferably, the QoS levels are defined by a Resource ReSerVation Protocol (RSVP) which is also responsible for said reservation of transmission capacity in the Internet.

With the Internet QoS levels set out above, the guaranteed QoS level is mapped to the circuit switched transmission mode of the radio telephone network. This ensures that transmissions over the radio telephone network occur with a guaranteed delay and bandwidth, i.e. corresponding to that for transmissions over the Internet. Other Internet QoS levels are mapped to the packet switched transmission mode. Where the packet switched transmission mode of the radio telephone network itself offers a number of QoS levels, there may be a sub-mapping between these QoS levels and the Internet QoS levels mapped to the packet switched transmission mode.

Preferably, said step of mapping is carried out by an Application Programming Interface (API) interposed between a user application, which is arranged to receive said transmitted data, and the RSVP layer. The API conveys the allocated QoS level to the RSVP layer and also causes a request to be made to the radio telephone network for the corresponding transmission mode.

One of said first and second hosts is preferably a mobile host, for example comprising a radio telephone wirelessly connected to the radio telephone network. More preferably, the step of transmitting the data over the internet is facilitated using Mobile IP to route data via the chosen transmission mode domain.

The radio telephone network is preferably a cellular telephone network. More preferably the telephone network is a GSM network, and said packet switched transmission mode is that known as GPRS. However, the present invention is also applicable to other cellular telephone networks and to satellite telephone networks.

According to a second aspect of the present invention there is provided apparatus for transmitting data between first and second Internet hosts coupled via the Internet and a digital radio telephone network, the apparatus comprising:

allocation means for allocating one of a plurality of predefined Internet Quality of Service (QoS) levels to the transmission, said QoS levels being defined in terms of the transmission delay over the Internet;

reservation means for reserving, if necessary, transmission capacity in the Internet to ensure the allocated QoS level is met;

transmission mode selection means for selecting one of a circuit switched or a packet switched transmission mode for transmitting the data over the radio telephone network, said selection being made on the basis of a mapping which maps at least one of the defined Internet QoS levels to the circuit switched transmission mode and maps the remaining QoS level(s) to the packet switched transmission mode; and transmission means for transmitting said data over the Internet and said radio telephone network according to said allocated QoS and said selected radio telephone network transmission mode.

BRIEF DESCRIPTION OF THE DRAWINGS

For a better understanding of the present invention and in order to show how the same may be carried into effect reference will now be made, by way of example, to the accompanying drawing, in which:

FIG. 4 is a flow chart of one embodiment of a method according to the invention.

DETAILED DESCRIPTION

Figure 1:
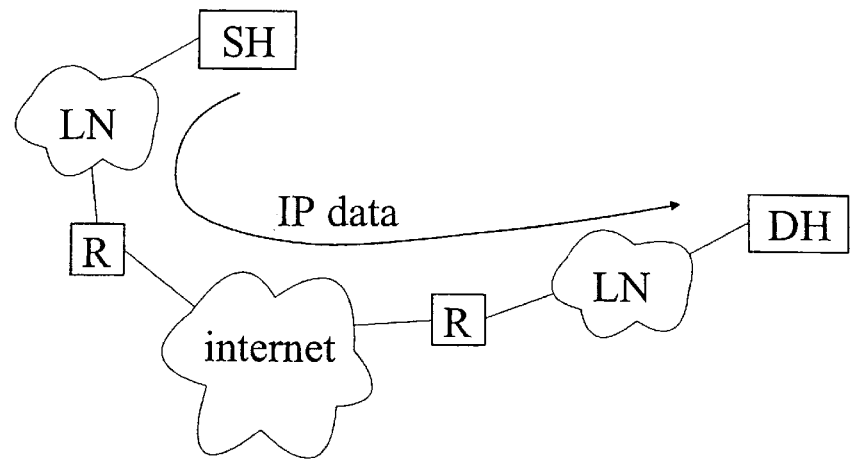
FIG. 1 illustrates schematically a source host and a destination host connected together via the Internet.

As has been described above, FIG. 1 illustrates schematically a conventional Internet connection by way of which two hosts (SH and DH) may exchange Internet data according to the Internet Protocol (IP). The proposed Resource ReSerVation Protocol (RSVP) may be applied to such an Internet connection to define a quality of service (QoS) level for the transmission.

Figure 2:
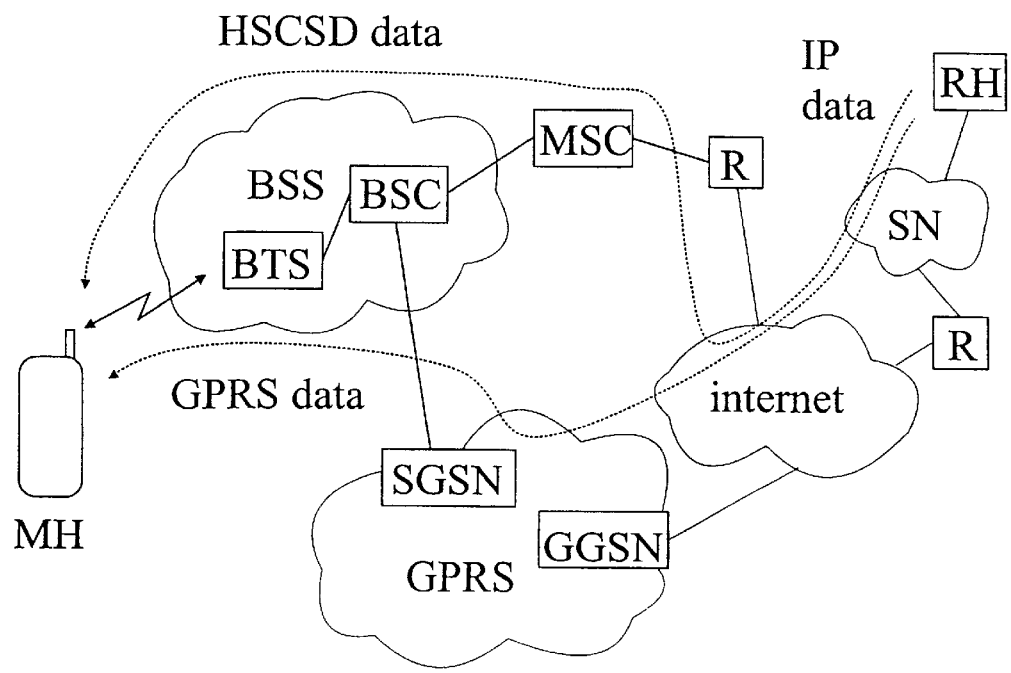
FIG. 2 illustrates schematically a mobile host coupled to the Internet via a GSM/GPRS cellular telephone network.

FIG. 2 illustrates schematically the situation where a mobile host (MH) is connected to the Internet via a digital cellular telephone network. For the purpose of the present example, this network is a GSM phase 2 network which allows for the transmission of user data by either a High Speed Circuit Switched Data (HSCSD) transmission link or by a General Packet Radio Service (GPRS) link. As will be described below, Internet data may be transmitted between the MH and the Internet via either of these links.

The MH communicates with a Base Transceiver Station (BTS) of a Base Station Subsystem (BSS) of the GSM network. The BTS provides radio coverage for one cell of the network, with signals being relayed to and from the BTS by a Base Station Controller (BSC). The main function of the BSC is the management of the channels on the radio interface and of handovers when a MH enters or leaves the cell.

Figure 3:
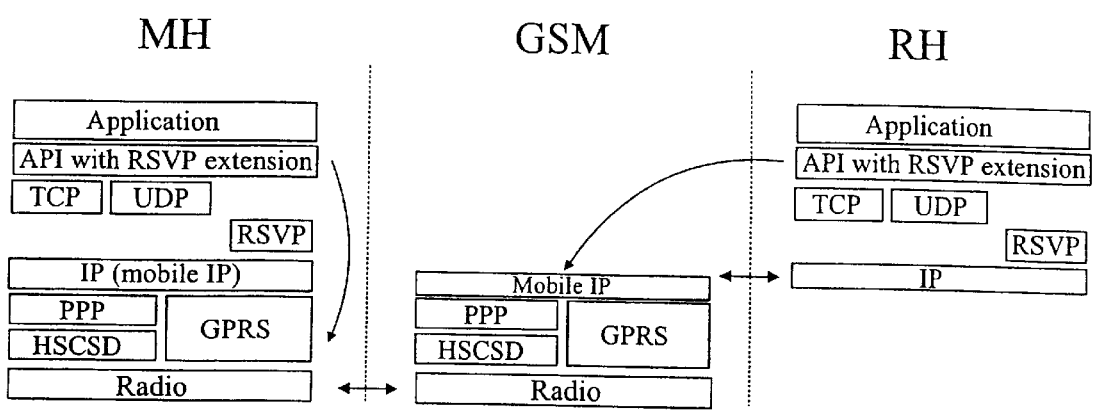
FIG. 3 illustrates the protocol layers required for a transmission via the system of FIG. 2.

FIG. 3 illustrates protocol layers provided at the MH, at the GSM network, and at a remote host (RH) connected to the Internet. It will be appreciated that these protocol layers are in practice implemented in software running on appropriate computer hardware, or by a combination of software and analogue components.

Consider that it is desired to transmit data from the RH to the MH. An application at the MH (which is the final destination for the transmitted data) allocates an RSVP QoS to this transmission prior to commencement of the transmission. The allocated QoS is conveyed to an Application Programming Interface (API) which has an RSVP extension. The API in turn conveys the allocated QoS to the RSVP layer. The RSVP layer is responsible for reserving sufficient capacity in the Internet to satisfy the allocated level of service. In the case of Guaranteed Service and Controlled Load Service, the RSVP must transmit control messages (Path and Resv) to the Internet to reserve capacity prior to receiving the application data. This is done via GPRS (QoS class 2). For Best Effort Service, no RSVP messages need to be transmitted.

The API additionally performs a mapping between the allocated RSVP QoS and transmission modes/QoS provided by the GSM cellular network, and initiates a telephone call according to the mapped mode/QoS. In particular, Guaranteed Service is mapped to HSCSD, Controlled Load Service is mapped to GPRS QoS class 3, and Best Effort Service is mapped to GPRS QoS class 4. These GPRS QoS classes form part of an ETSI recommendation. In the event that HSCSD is selected as the transmission mode, the MH requests and receives an Internet address from the network using PPP. If, on the other hand, GPRS is the selected transmission mode, a Gateway GPRS Support Node (GGSN) (see below) acts as a Home Agent for the MH and maps a unique Internet address to the line ID number of the MH.

At the RH, data for transmission to the Internet is generated by some top level application, usually a user operated application. The application generated data ("application data") is interfaced to Internet protocol layers by a peer Application Programming Interface (API). The Internet protocol layers comprise the TCP and UDP layers and the IP layer (with Mobile IP extension), as well as an RSVP layer (this peer RSVP layer is only used when the RH wishes to receive data from the MH). The application data, now formatted according to IP, is transmitted via the RH's subnetwork and a router to the Internet using reserved capacity if either Guaranteed or Controlled Load Services have been allocated. When the data reaches the GSM network, it is routed either to the GPRS network, via the GGSN, or to a HSCSD network via a further router. In the case of the former, data is formatted by a GPRS layer according to the determined GPRS QoS (class 3 or 4) and is passed to the BSS via a Serving GPRS Support Node (SGSN). In the case of the latter, a Mobile Switching Centre (MSC) receives the IP formatted data and processes it according to an HSCSD layer before passing it to the BSS. It is noted that the Mobile IP is implemented in either the GGSN or the SGSN to route received data through the corresponding domain (i.e. GPRS or HSCSD) in the GSM network.

At the BSS, the BSC controls the allocation of radio channels in accordance with the selected radio transmission mode. The BTS then uses a radio protocol layer to apply the IP formatted data (in either GPRS or HSCSD format) to a carrier signal for transmission to the MH. The mobile host process the received data firstly at a Radio layer to recover the GPRS/HSCSD formatted data, then at a GPRS or HSCSD layer to recover the IP formatted data, and then at an IP layer to recover the application data. The application data is then passed to the application layer at the MH via the API.

It will be understood that the above process is effectively carried out in reverse when data is to be transmitted from the application at the MH to a peer application at the RH. It will also be appreciated by the skilled person that modifications may be made to the above described embodiment without departing from the scope of the present invention.

FIG. 4 illustrates a method according to the invention. The method starts from step 41. In step 42, three Internet Quality of Service levels are defined: a guaranteed service level which guarantees both delay and bandwidth; a controlled load service level which provides a service level closely approximating the service level that would be provided by an unloaded network, even when the network is overloaded; and a best effort service which guarantees neither delay nor bandwidth. In step 44, a QoS level is allocated to a transmission. In step 45, it is checked whether it is necessary to reserve data transmission capacity in the Internet for the transmission. If yes, then data transmission capacity is reserved in the Internet for the transmission, step 46. Otherwise, the operation jumps from step 45 to step 47. In step 47, it is checked which data transmission mode is mapped with the service level allocated to the transmission. In case of packet switched data transmission, the transmission is sent using the packet switched mode, step 48, and the operation returns to step 44. In case of circuit switched data transmission, the transmission is sent using the circuit switched mode, step 49, and the operation returns to step 44.

Glossary

API Application Programming Interface
BSC Base Station Controller
BSS Base Station Subsystem
BTS Base Transceiver Station
CSD Circuit Switched Data
DH Destination Host
DHCP Dynamic Host Configuration Protocol
ETSI European Telecommunications Standards Institute
GGSN Gateway GPRS Support Node
GPRS General Packet Radio Service
GSM Global System for Mobile communications
HSCSD High Speed Circuit Switched Data
IETF Internet Engineering Taskforce
IP Internet Protocol
MH Mobile Host
MSC Mobile Switching Centre
PPP Point to Point Protocol
QoS Quality of Service
R Router
RH Remote Host
RSVP Resource Reservation Protocol
SGSN Serving GPRS Support Node
SH Source Host
SN Subnetwork
TCP Transfer Control Protocol
UDP User Datagram Protocol

What is claimed is:

1. Apparatus for transmitting data between first and second Internet hosts coupled via the Internet and a digital radio telephone network, the apparatus comprising:

allocation means for allocating one of a plurality of predefined Internet Quality of Service (QoS) levels to the transmission, said QoS levels being defined in terms of the transmission delay over the Internet;

reservation means for reserving, if necessary, transmission capacity in the Internet to ensure the allocated QoS level is met;

transmission mode selection means for selecting one of a circuit switched or a packet switched transmission mode for transmitting the data over the radio telephone network, said selection being made on the basis of a mapping which maps at least one of the defined Internet QoS levels to the circuit switched transmission mode and maps the remaining QoS level(s) to the packet switched transmission mode; and transmission means for transmitting said data over the Internet and said radio telephone network according to said allocated QoS and said selected radio telephone network transmission mode.

2. A mobile telecommunications device comprising the apparatus of claim 1.

3. A method of transmitting data between first and second Internet hosts coupled via the Internet and a digital radio telephone network, wherein one of said first and second hosts is a mobile host wirelessly connected to the radio telephone network, and the radio telephone network is a GSM network, and the packet switched transmission mode is GPRS, the method comprising the steps of:

defining a plurality of Internet Quality of Service (QoS) levels in terms of the transmission delay over the Internet;

mapping at least one of the defined Internet QoS levels to a circuit switched transmission mode of the radio telephone network and mapping the remaining QoS level(a) to a packet switched transmission mode of the radio telephone network;

prior to transmitting the data, allocating one of the QoS levels to the transmission and, if necessary, reserving transmission capacity in the Internet to ensure that the allocated QoS level is met; and transmitting the data over the Internet and the radio telephone network, wherein the step of transmitting the data over the Internet is facilitated using Mobile IP to route data via the chosen transmission mode domain and wherein the transmission over the radio telephone network uses the transmission mode mapped to the allocated QoS level.

4. A method of transmitting data between first and second Internet hosts coupled via the Internet and a digital radio telephone network, the method comprising:

defining a plurality of Internet Quality of Service (QoS) levels in terms of the transmission delay over the Internet;

mapping at least one of the defined Internet QoS levels to a circuit switched transmission mode of the radio telephone network and mapping the remaining QoS level(s) to a packet switched transmission mode of the radio telephone network;

prior to transmitting said data, allocating one of said QoS levels to the transmission and, if necessary, reserving transmission capacity in the Internet to ensure the allocated QoS level is met; and transmitting said data over the Internet and said radio telephone network, wherein the transmission over the radio telephone network uses the transmission mode mapped to the allocated QoS level.

5. A method according to claim 4, wherein said Internet QoS levels include: a guaranteed service level which guarantees both delay and bandwidth; a controlled load service level which provides a service level closely approximating the service level that would be provided by an unloaded network, even when the network is overloaded; and a best effort service which guarantees neither delay nor bandwidth.

6. A method according to claim 5, wherein the QoS levels are defined by a Resource ReSerVation Protocol (RSVP) which is also responsible for said reservation of transmission capacity in the Internet.

7. A method according to claim 5, wherein said guaranteed service level is mapped to the circuit switched transmission mode of the radio telephone network and the controlled load service level and the best effort service level are mapped to the packet switched transmission mode.

8. A method according to claim 7, wherein the packet switched transmission mode of the radio telephone network offers a number of QoS levels and a sub-mapping is made between these packet switched QoS levels of the radio telephone network and the Internet QoS levels mapped to the packet switched transmission mode.

9. A method according to claim 7, wherein said step of mapping is carried out by an Application Programming Interface (API) interposed between a user application, which is arranged to receive said transmitted data, and the RSVP layer, the API conveying the allocated QoS level to the RSVP layer and also causing a request to be made to the radio telephone network for the corresponding transmission mode.

10. A method according to claim 4, wherein one of said first and second hosts is a mobile host wirelessly connected to the radio telephone network.

11. A method according to claim 10, wherein the step of transmitting the data over the internet is facilitated using Mobile IP to route data via the chosen transmission mode domain.

12. A method according to claim 11, wherein the radio telephone network is a cellular telephone network.

13. A method according to claim 12, wherein the radio telephone network is a GSM network, and said packet switched transmission mode is GPRS.

* * * * *